(12) United States Patent
Lemoine et al.

(10) Patent No.: US 6,269,926 B1
(45) Date of Patent: Aug. 7, 2001

(54) FRICTION CLUTCH WITH ELECTROMECHANICAL ACTUATOR, IN PARTICULAR FOR MOTOR VEHICLE

(75) Inventors: Benoit Lemoine, Saint Ouen; Gilles Lebas, Asnieres; Jacques Boclet, Livry-Gargan; Michel Graton, Paris; Vévé R. Randriazanamparany, Rueil-Malmaison; André Tobiasz, Epinay sur Seine, all of (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/068,941

(22) PCT Filed: Sep. 25, 1997

(86) PCT No.: PCT/FR97/01680

§ 371 Date: Sep. 14, 1998

§ 102(e) Date: Sep. 14, 1998

(87) PCT Pub. No.: WO98/13614

PCT Pub. Date: Apr. 2, 1998

(30) Foreign Application Priority Data

Sep. 25, 1996 (FR) .................................. 96 11920
Mar. 25, 1997 (FR) .................................. 97 03627

(51) Int. Cl.$^7$ .................................................. F16D 27/00
(52) U.S. Cl. .................. 192/84.6; 192/30 W; 192/90
(58) Field of Search ............... 192/84.6, 90, 70.25, 192/70.27, 89.23, 30 W, 111 A; 324/174, 207.2

(56) References Cited

U.S. PATENT DOCUMENTS

| | | | |
|---|---|---|---|
| 4,586,401 | * | 5/1986 | Nogle ........................... 324/174 X |
| 4,865,173 | * | 9/1989 | Leigh-Monstevens et al. ... 192/90 X |
| 4,878,396 | * | 11/1989 | Grunberg ........................... 192/90 X |
| 5,267,635 | * | 12/1993 | Peterson et al. ....................... 192/90 |
| 5,353,902 | * | 10/1994 | Flowtow et al. .................... 192/84.6 |
| 5,704,460 | * | 1/1998 | Leimbach .......................... 192/70.25 |

FOREIGN PATENT DOCUMENTS

| | | | |
|---|---|---|---|
| 296 05 182 U | * | 6/1996 | (DE) . |
| 287860 | * | 10/1998 | (EP) . |
| 2424442 | * | 11/1979 | (FR) . |
| 2124321 | * | 2/1984 | (GB) . |
| 2215791 | * | 9/1989 | (GB) . |
| 2225082 | * | 5/1990 | (GB) . |
| 2279124 | * | 12/1994 | (GB) . |

\* cited by examiner

Primary Examiner—Rodney H Bonck
(74) Attorney, Agent, or Firm—Liniak, Berenato, Longacre & White

(57) ABSTRACT

The friction clutch has on the one hand a clutch engagement device comprising a diaphragm (3) and on the other hand a linkage (80), an actuator (50, 60, 70, 90, 91) for controlling the said linkage, and an adjustment device (10), for compensating for the wear on the friction linings (7) the actuator has an electric motor (50), a mechanical transmission (60) with an input element (51) and an elastic assistance device (70) bearing on a fixed part (91, 66) and on a movable part (61) forming a nut for cooperating with the output shaft (51) of the electric motor, the movable part (61) forms the output element of the mechanical transmission (60) while being able to act on the linkage (80) while the device for taking up wear (10) is mounted inside the declutching device.

11 Claims, 7 Drawing Sheets

FRICTION CLUTCH WITH ELECTROMECHANICAL ACTUATOR, IN PARTICULAR FOR MOTOR VEHICLE

BACKGROUND OF THE INVENTION

The present invention concerns friction clutches, notably for motor vehicles, including on the one hand a clutch engagement device comprising a diaphragm bearing on a cover, fixed to a flywheel for driving in rotation, for action on a thrust plate and clamping the friction linings of a friction disc between the thrust plate and the driving flywheel and on the other hand a linkage for acting in an opposing fashion on the internal end of the diaphragm, an actuator for controlling the said linkage, and an adjustment device, referred to as a device for taking up wear, for compensating for the wear on the friction linings, in which the actuator has manoeuvring means with an electric motor, a mechanical transmission with an input element formed by the output shaft of the electric motor, an output element for acting on the linkage, elastic assistance means acting between a fixed part and an element of the transmission in order to act in an opposing fashion with respect to the diaphragm so that the electric motor provides only a small force for disengaging the clutch.

For example (FIG. 1) the actuator has an electric motor 50 acting on a mechanical transmission 60 having pinions and a toothed sector to which is attached a coil spring 70 constituting the elastic assistance means.

The linkage 80 has a fork connected to the toothed sector and a clutch release bearing acting on the internal end of the fingers of the diaphragm mounted pivotally on the base of the cover 2 by means of assembly means 8 having a primary support formed by pressing in the base of the diaphragm and a spring ring forming a secondary support opposite the primary support.

The spring ring, in a known fashion, is carried by lugs formed by cutting and bending in the base of the cover, the said lugs passing through the diaphragm 3 having in a known fashion a peripheral part in the form of a Belleville washer extended radially inwards by a central part divided into radial fingers by slots. The Belleville washer constitutes the clutch engagement means, whilst the radial fingers form the clutch disengagement means.

The external periphery of the diaphragm 3 bears on the thrust plate 1 in order to clamp the friction linings of the friction disc 6 between the thrust plate 1 and the driving flywheel 102 fixed, in a manner which cannot be seen, to a driving shaft, whilst the friction disc 6 has centrally a fluted hub cooperating with the flutes on a driven shaft 101 passing through the aforementioned clutch release bearing. Thus referred to the clutch release bearing, the characteristic curves of FIG. 2 are obtained, in which the X-axis C corresponds to the travel of the clutch release bearing in mm and the Y-axis E to forces in newtons.

The curve A corresponds to the load on the clutch release bearing, the curve B to the opposing load of the elastic assistance means and the curve D to the force developed by the electric motor.

The elastic assistance means store the energy of the diaphragm 3 during the clutch engagement operation and restores it, usually more quickly, at the time of the declutching operation.

Thus the electric motor supplies only the difference between the force of the diaphragm and the force of the elastic assistance means.

In addition, as described in the document FR-A-2 564 921, a device for taking up wear is provided, making it possible to reduce the travel of the elastic assistance means, thus affording excellent behaviour of these elastic means, which can thus be located conveniently in the actuator.

Nevertheless it may be desirable to reduce the cost of the actuator still further and to simplify the latter still further whilst having a robust and compact design.

The object of the present invention is to meet these requirements.

SUMMARY OF THE INVENTION

According to the invention a friction clutch of the above-mentioned type is characterised in that the elastic assistance means bear on a fixed part and on a part which is movable in translation and fixed in rotation forming a nut for cooperating with the output shaft of the electric motor, forming a screw, movable in rotation and fixed in translation, in that the movable part forms the output element of the mechanical transmission whilst being able to act on the linkage and in that the device for taking up wear is mounted within the declutching device.

By virtue of the invention the linkage and the actuator of the electromechanical type are simplified since the device for taking up wear is mounted within the clutch engagement device, which makes it possible to increase the service life of the said clutch, whilst having a stable and roughly constant position for the declutching means, such as a diaphragm, when the clutch is in the engaged position.

The actuator is simplified since it has no toothed sector and pinion. It is also light.

In one embodiment the elastic assistance means consist of a simple coil spring surrounding the nut, which makes it possible to reduce costs and to make the actuator compact and robust.

In another embodiment the elastic assistance means have recourse to a mounting of Belleville washers in series.

Mounting the Belleville washers in series makes it possible to easily reproduce the characteristic curve of the diaphragm in association with the driving system of the nut and screw type formed by the movable part and the output shaft of the electric motor.

In addition, during the declutching operation, it is possible to have sufficient travel because of the mounting in series of the said washers compressed when the clutch is engaged and sloping during the declutching travel of the clutch.

The actuator is thus compact and robust and of reduced cost, its mechanical transmission being simplified.

In one embodiment the actuator has a casing fixed to a plate serving as a support for the electric motor, the casing/plate assembly forms a housing mounted on a fixed part.

The threaded output shaft of the electric motor enters the said casing and the movable part, forming a nut, of the mechanical transmission. This nut can be connected with respect to rotation to a sleeve on the housing, with the possibility of axial movement for example by a connection of the mortice and tenon type. The nut carries a movable support for the coil spring or Belleville washers, whilst the plate or casing carries a fixed support for the said spring or the said Belleville washers.

Force transmission means can easily be located between the external and respectively internal peripheries of the Belleville washers. These force transmission means are guided in a simple and economical fashion respectively by the casing and the nut. The actuator is thus very inexpensive whilst being reliable, and of a simple, robust and compact form. The risks of jamming are reduced.

The nut acts either by pulling or by pushing on the linkage, which may include in a conventional fashion a release fork acting on the clutch release bearing. In a variant this linkage has a hydraulic control with a receiver whose piston acts on the clutch release bearing and a sender whose piston is controlled by the nut of the actuator. The receiver is, in this case, of the concentric type, whilst having the driven shaft passed through it centrally. The nut can act on a cable of the linkage.

As a variant the electric motor can be mounted on a plate fixed to the cover of the clutch, as described in the document FR-A-2 580 753.

In all cases the actuator forms an assembly which can be handled and transported easily and fitted easily because of its small size.

In another embodiment the output shaft of the electric motor drives a phonic wheel associated with a Hall-effect sensor for measuring the movement of the movable part. It is even possible to mount the power electronics in the casing.

The following description illustrates the invention with regard to the accompanying drawings, in which.

DESCRIPTION OF THE PREFERRED EMBODIMENTS

Figure 1:
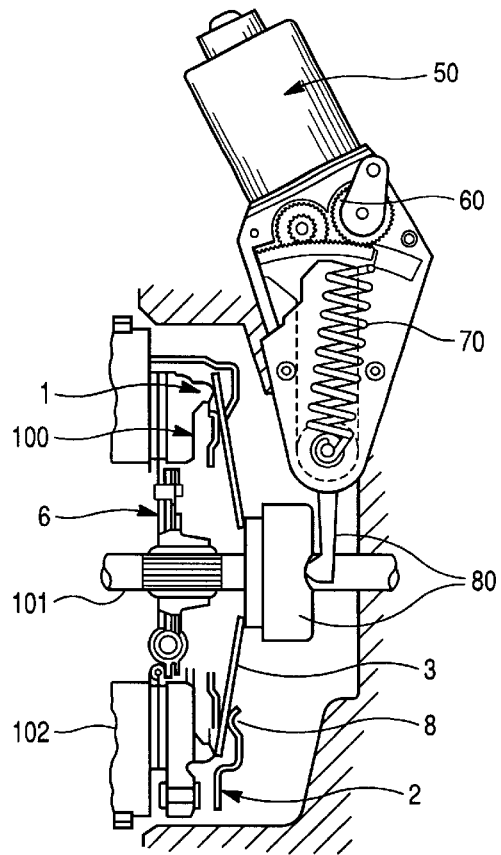
FIG. 1 is a view in schematic axial section of a clutch of the prior art.

In the figures the elements common to the invention and to the prior art will, for reasons of simplicity, be given the same reference signs.

Likewise the elements common to FIGS. 6 to 10 will be given the same reference signs.

Thus, in FIGS. 3 to 10, according to the invention, the friction clutch has a clutch engagement device 100, manoeuvring means with electric motor 50, a mechanical transmission 60, elastic assistance means 70 and a linkage 80.

The clutch engagement device 100 has within it, according to one characteristic of the invention, a device for taking up wear 10.

More precisely the clutch engagement device 100 has a flywheel for driving in rotation 102, a friction disc 6 carrying at its external periphery friction linings 7, a thrust plate 1, a cover 2 fixed to the reaction plate 102, a diaphragm 3 acting between on the one hand the cover 2 and on the other hand the thrust plate 1, here by means of support means 14, a device for taking up wear 10 comprising ramp means 11 carried by the thrust plate.

The driving flywheel 102, possibly divided, forms here a reaction plate offering at its back a friction face for the friction lining 7 concerned. This flywheel is fixed with respect to rotation to a first shaft, such as a driving shaft. The thrust plate 1 has at its front a friction face for the other friction lining 7. At its back it has here studs 4 (FIG. 4) intended to cooperate with ramps 15 forming part of the ramp means 11 consisting here of an annulus having ramps 15 which are inclined and distributed circumferentially.

The annulus 11 is here metallic and has support zones 14 constituting the support means for the diaphragm 3, here for the Belleville washer thereof. It also has teeth 18 at its external periphery.

The thrust plate 1 is fixed with respect to rotation to the cover 2, here hollow in shape with a base with a central hole, and this with axial mobility by means of elastic tongues (not visible) exercising a function of return of the thrust plate 1 towards the base of the cover 2 carrying columns 8 with a profiled head for pivoting mounting of the diaphragm 3—more precisely of the internal periphery of the Belleville washer of the diaphragm 3—on the cover 2 having opposite the columns 8 another support formed for example by pressing out its base.

The friction disc 6 has at its internal periphery, in a known fashion, an internally fluted hub for its connection with respect to rotation to a second shaft, such as a driven shaft as can be seen in FIG. 1.

Since it is a case of an application to a motor vehicle, the first shaft is here the crankshaft of the engine to which is fixed the flywheel 102 carrying the thrust plate 1, the cover 2 and, by gripping, the friction disc 6, whose central hub is here connected with respect to rotation to the input shaft of the gearbox constituting the second shaft, and this in a releasable fashion, the friction linings 7 being normally clamped between the plate 1 and flywheel 102. The torque is thus transmitted from the crankshaft to the input shaft of the gearbox.

The clutch is therefore normally engaged. In order to disengage the clutch it is necessary, by means of the aforementioned linkage 80, to act on the internal end of the fingers of the diaphragm 3 in order to cause the latter here to pivot about the columns 8 in order to progressively cancel out the load exerted by it on the thrust plate 1, more precisely on the support means 14 (the support zones 14 of the annulus 11). The aforementioned elastic tongues, usually of tangential orientation, then return the thrust plate 1 in the direction of the base of the cover 2 in order to release the friction linings 7. The clutch is then disengaged (declutched). By releasing the action exerted by the linkage 80 on the diaphragm 3, the clutch then passes from its disengaged position to its engaged position, in which the diaphragm is in contact with the support carried by the base of the cover 2. The linkage 80 therefore acts in an opposing fashion on the diaphragm 3, whilst being controlled by an electromechanical actuator described below.

During the lifetime of the clutch, the friction linings 7 wear, as do, to a lesser extent, the friction faces of the thrust plate 1 and of the flywheel 102.

The thrust plate 1 therefore moves closer to the flywheel 102. As is known, the diaphragm 3, in the free state, has a tapered shape.

Once mounted in the clutch device, its conicity varies.

Figure 2:
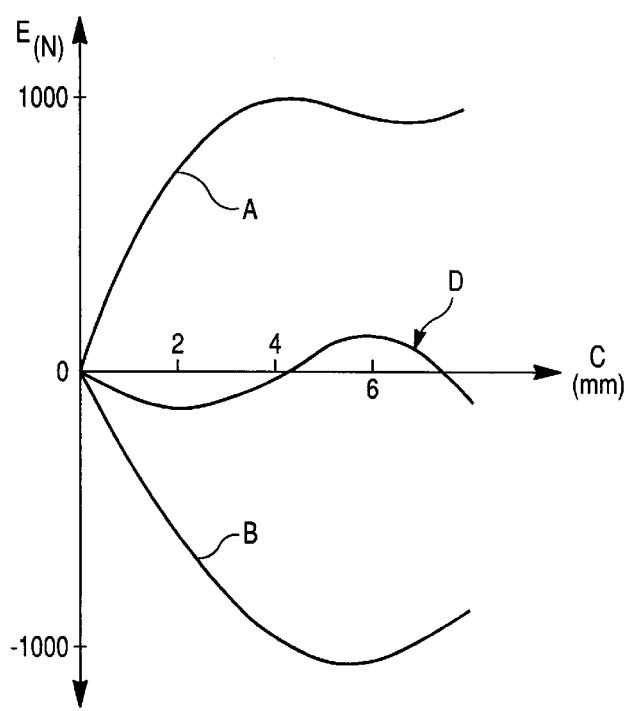
FIG. 2 is a view showing the characteristic curves of this clutch.

In general terms the characteristic curve of the diaphragm is a function of its dimensions, its thickness and the height of the truncated cone of its Belleville washer part. Its characteristic curve (load exerted—deflection) has a trend which increases up to a maximum, then a trend which decreases to a minimum in order then to increase. In the clutch engaged position, with new friction linings 7, the diaphragm occupies a position corresponding to a point on the falling part of its characteristic curve. According to the wear on the friction linings, it approaches the maximum of its curve, then goes past this maximum, its exerted load then decreasing until it can no longer transmit the torque of the motor. According to the aforementioned wear its inclination varies. The role of the device for taking up wear 10 is to keep the diaphragm 3 always in the same position when the clutch is engaged and therefore to compensate at least for the wear on the friction linings. For more information on the trend of the characteristic curve of the diaphragm reference should be made to FIG. 2 (curve A) which corresponds roughly to the lever arm ready for the load exerted by the linkage 80 in order to disengage the clutch.

This linkage includes a clutch release bearing 81 (FIG. 3) able to act on the internal end of the fingers of the diaphragm. This bearing 81 in this figure is mounted so as to slide along the guide tube 83 fixed to the gearbox. The guide tube 83 has the input shaft of the gearbox, visible at 101 in FIG. 1, pass through it internally.

The bearing 81 is here subjected to the action of a clutch release fork 82 (only one of whose two fingers can be seen here) pivotally mounted on a fixed part of the vehicle, namely here the casing of the gearbox.

The pivoting mounting is achieved for example by means of a swivel or a shaft. The free end of the fork is subject to the action of an electromechanical actuator including the manoeuvring means with electric motor 50, the elastic assistance means 70 and the mechanical transmission 60 acting on the linkage 80.

According to the location of the actuator with respect to the free end of the fork, the former acts by pushing or pulling on the latter, according to the type of clutch.

In fact, in general terms, the clutch, instead of being of the pushed type like the one in FIG. 1—the clutch release bearing 81 acting by pushing on the diaphragm in order to disengage the clutch—the said clutch can be of the pulled type—the clutch release bearing then acting by pulling on the inner end of the fingers of the diaphragm 3 in order to disengage the clutch. In this case, the external peripheral part of the Belleville washer of the diaphragm 3 bears on the cover, whilst the internal periphery of the said Belleville washer then bears on the support means (the areas 14) carried by the thrust plate.

Figure 3:
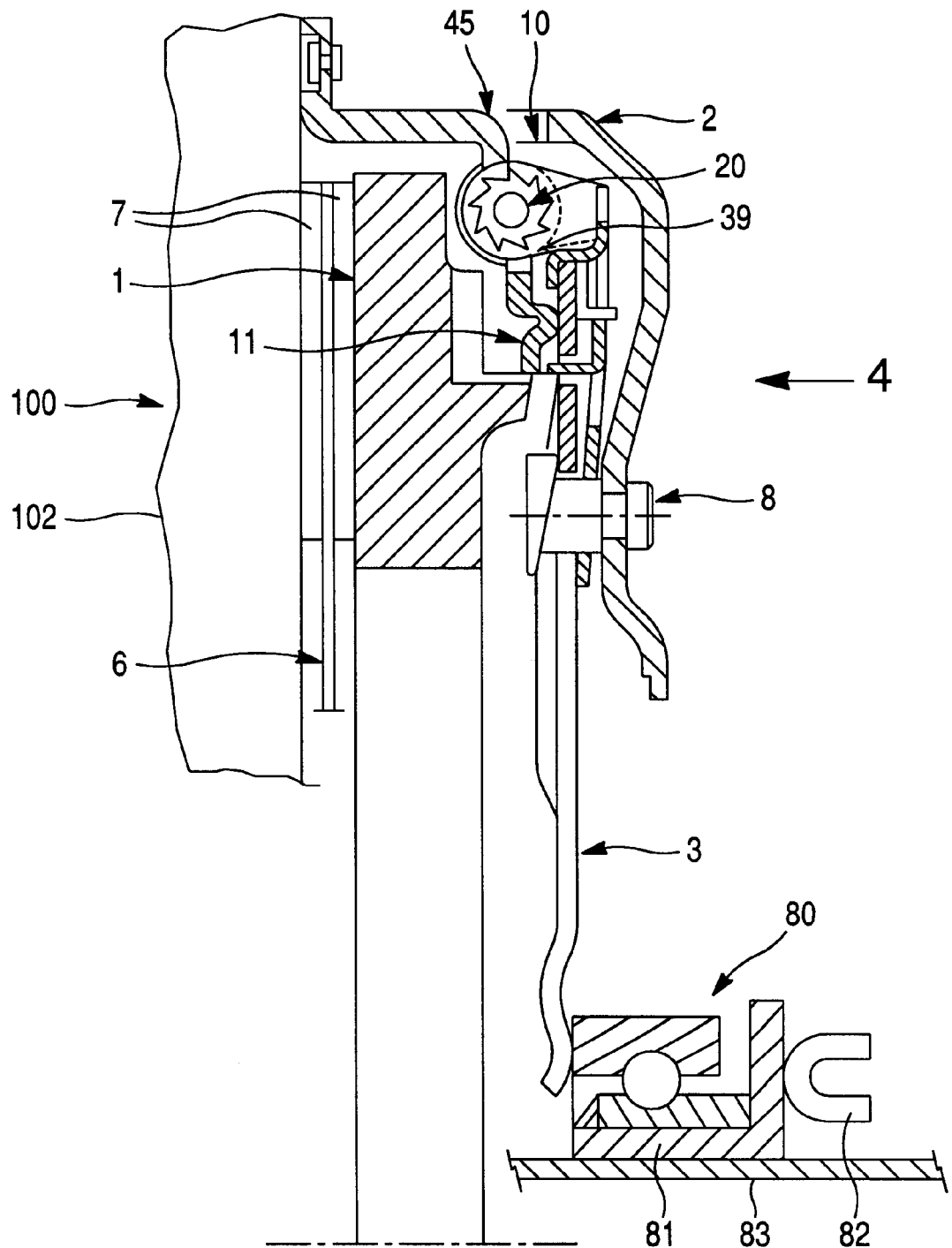
FIG. 3 is a half view in axial section, without the actuator, of a clutch equipped with a device for taking up wear according to the invention.

In a conventional fashion, as can be seen in FIG. 3, the clutch release bearing has a ball bearing with on the one hand a rotating ring in contact directly with the diaphragm in the case of a clutch of the pushed type or in indirect contact with the diaphragm by means of an abutment piece situated behind the diaphragm in the case of a clutch of the pulled type and on the other hand a non-rotating ring coupled, for example by means of a self-centring spring or a cap, to a manoeuvring sleeve subject to the action of a control member, such as the declutching fork 82, acting by pushing or pulling, depending on circumstances, on the said sleeve. A pre-loading spring usually acts on the linkage 80 in order to keep the clutch release bearing in constant abutment on the diaphragm.

The device for taking up wear 10 has means of detecting the wear on the friction lining 7 (and to a lesser extent the wear on the plate 1 and flywheel 102) associated with driving means in order to rotate the support means, usually when the clutch is in the disengaged position.

The detection means can include a pin carried so as to rub, for example by the thrust plate, in order to cooperate with the flywheel or cover. This pin is associated with elastic means, for example coil springs, enabling the support means 14 to be driven in rotation in the event of wear, when the clutch is disengaged. Various configurations can be envisaged.

In FIG. 3 the detection means include a blade 45 carried by the cover 2 cooperating with the inclined teeth 21 of a ratchet wheel 20 fixed to a spindle 22, which also slidingly carries a worm 13. The worm thread and pitch are adapted to the teeth 18 carried by the annulus 11 and form an irreversible system, the worm 13 being able to move the teeth 18, but not vice versa.

Figure 4:
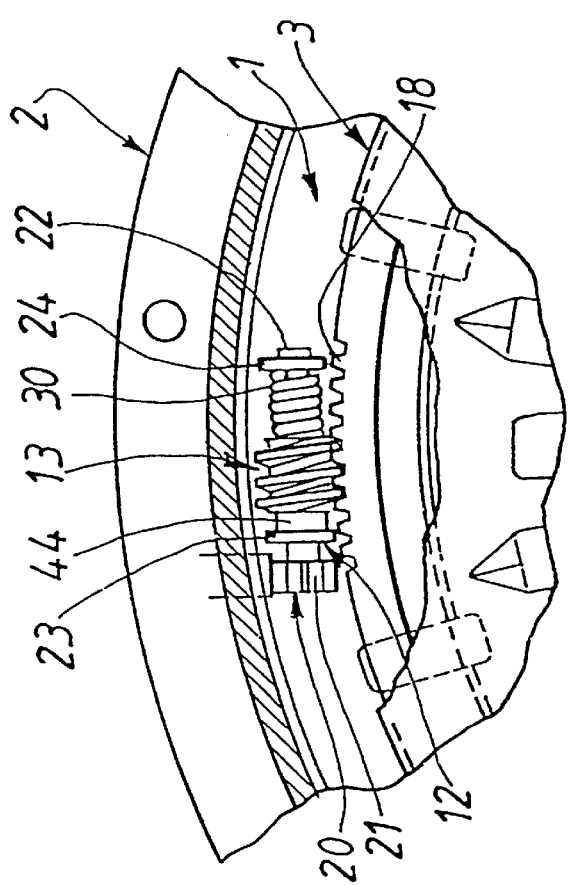
FIG. 4 is a partial view in the direction of the arrow 4 in FIG. 3 showing the ratchet and worm wheel which forms part of the said device for taking up wear.
Figure 5:
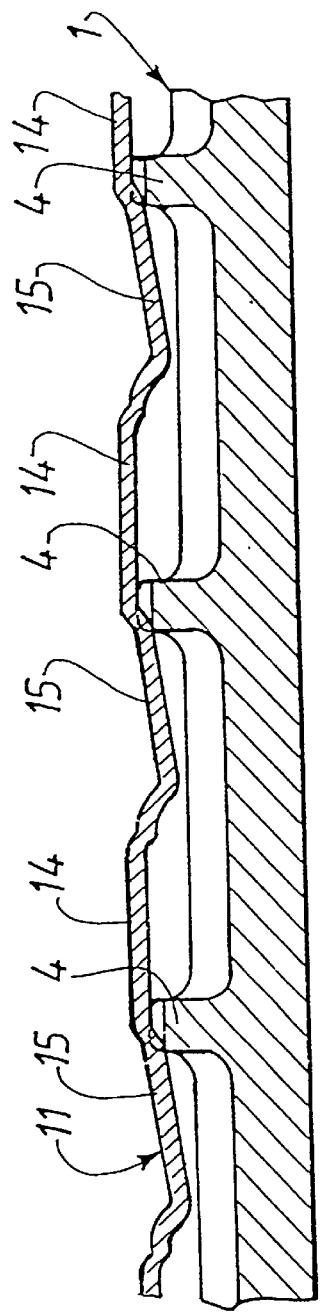
FIG. 5 is a view in axial section showing the ramp means of the said device for taking up wear.

The spindle 22 is carried by a support 12 and for this purpose has flanges 23 and 24 (FIG. 4).

This support 12 also carries a helical taking-up spring surrounding the spindle 22 carrying a collar 44. This support 12 is carried by the diaphragm 3 and has a non-return catch 39 adapted to cooperate with the teeth 29 on the ratchet wheel 20.

In the event of wear, the ratchet wheel 20 moves closer to the blade 45 adapted to rotate the ratchet wheel and to arm the spring 30 following a certain amount of wear, the blade 45 then jumping one tooth. The arming of the spring takes place when the clutch is engaged. In the clutch disengaged position, the spring 30 is then caused to rotate the worm 13 then driving in rotation the teeth 18 and annulus 11, which by cooperation of the ramps 15 with the studs 4—which in a variant can be replaced by ramps complementary to the ramps 15—of the thrust plate 1, moves axially so that the support areas 14 move closer with respect to the base of the cover 2 in order to maintain the diaphragm 3 in a substantially constant position when the clutch is engaged.

The thickness between the support zones 14 and the friction face of the thrust plate 1 in contact with the friction lining 7 of the friction disc 7 is therefore increased.

Thus the device for taking up wear 10 has a worm 13 mounted so as to slide along its spindle 22 whilst being subjected to the action of an elastic taking-up means (the spring 30). It is when the worm 13 is moved along its spindle that it drives the ramp means (the annulus 11) in circumferential rotation, the load of the spring 30 increasing with the wear on the friction linings 7, the axial movement being obtained by action of the spring 30 when its load is sufficiently high to overcome the return force due to the elastic tongues for connecting the thrust plate 1 with respect to rotation to the cover 2 acting on the annulus 11, the clutch being disengaged. The ratchet wheel 20 and blade 45 constitute means of driving in rotation made operational by the wear on the friction linings 7 when the clutch is engaged. The non-return catch 39 prevents the worm from turning in the opposite direction to the one in which it is rotated by the means of driving in rotation 20, 45 when they are made operational.

For more information reference should be made to the document FR 95 11090 published under the number 2 739 158.

As will have been understood the location of the device for taking up wear 10 within the clutch engagement device makes it possible to simplify the linkage 80 and electromechanical actuator 50, 60, 70. This also makes it possible to increase the service life of the clutch.

The electric motor 50 thus drives the mechanical transmission 60 in a travel independent of the wear on the friction linings 7 and/or plate 1 and flywheel 2.

This travel is always the same. The elastic assistance means 70 enable the electric motor 50, in a known fashion, to develop only a low force. These elastic means 70, in the manner of a lift, store the energy of the diaphragm 3 whilst the latter passes from its clutch disengaged position to its clutch engaged position (that is to say during the engagement of the clutch) and restores it at the moment of declutching (passage from the clutch engaged position to the clutch disengaged position).

The elastic assistance means therefore act in an opposing fashion with respect to the diaphragm 3.

In the clutch engaged position the elastic means 70 do not exert any force, or only a small force, on the linkage 80 and therefore on the diaphragm. This is possible throughout the life of the clutch since the diaphragm, by virtue of the device for taking up wear 10, always occupies the same position. As is known the power supply terminals of the electric motor 50 (visible at 53 and 54 in FIG. 8) are connected to an electronic module situated outside the actuator 50, 60, 70.

This module includes for example a microcomputer, such as a microprocessor, information processing circuits and, for example, power transistors connected in series in order to control the motor in both directions of rotation. The electronic module forms part of an electronic circuit having a certain number of sensors sending information to the electronic module.

These sensors notably sense the speed of the driving shaft (the crankshaft) and the driven shaft (the input shaft of the gearbox), the travel of the actuator, the state of the gearbox (the ratio engaged) and the state of the gear-change lever (force sensor).

From all this a strategy is produced for the clutch engagement and disengagement operations. The rotary motor 50 is therefore energized only for very short instants (declutching operation) and therefore consumes very little energy, supplied here by the vehicle battery. Its power is very low by virtue of the elastic assistance means 70. All this makes it possible to have a lightweight electromechanical actuator 50, 60, 70.

For the purpose of reducing the costs of the actuator still further, the invention proposes that the elastic assistance means 70 bear on a fixed part and on a movable part forming a nut as described below. In FIGS. 3 to 8 the invention proposes to use Belleville washers 71 to 72 mounted in series in order to constitute the elastic assistance means.

Thus it is possible to effect the travel necessary for disengaging the clutch whilst reproducing, in absolute value having regard to the lever arms, the characteristic curve of the diaphragm by virtue notably of the Belleville washers 71 to 74 acting in an opposing fashion, so that the electric motor 50 develops only a low power.

Here the actuator (FIG. 6) has a flange 91 onto which the electric motor 50 is fixed, for example by means of screws (in this figure the axes of the screws are seen).

This flange has, at its internal periphery, a fixed support 79, here rounded, annular in shape, and a ball bearing 52 carrying the output shaft S1 of the electric motor. This flange 91 therefore has a central hole for passage of the shaft 51 and is shaped so as to form a bearing support.

The output shaft 51 of the electric motor 50 is thus, in a known fashion, fixed with respect to translation (axially) and movable with respect to rotation when the motor is supplied electrically.

The flange 91 is fixed to a casing 90 having at its rear end a sleeve 64 provided with a guide groove 65. More precisely the flange 91 constitutes a cover for the hollow-shaped casing 90 and is fixed to the open front end of the casing 90, and therefore the base 66 has a central hole and carries the sleeve 64.

The assembly consisting of casing 90 and flange 91 forms a fixed housing and is fixed to a fixed part of the vehicle, for example the gearbox housing. The casing 90 or flange 91 has for this purpose lugs which are not visible.

The shaft 51 has a threaded end and constitutes the input element of the mechanical transmission 60. The shaft 51, according to one characteristic of the invention, comes into engagement with a tubular-shaped nut 61. This nut 61 has an annular movable support 78, here rounded, carried by a radially projecting collar 68 able to come into abutment against the transversely oriented base 66 of the casing 90, having an axially oriented annular skirt 67 extending the base 66.

According to one characteristic the nut 60 is fixed with respect to rotation and movable axially (in translation).

Here four Belleville washers 71 to 74 mounted in series are provided. Force transmission means 75 to 76 act between the external and internal peripheries of the adjacent Belleville washers. The washers 71 to 74 are able to have the output shaft 61 pass through them.

More precisely, in axial succession the rear end Belleville washer 71 bears at its internal periphery on the movable support 78 and at its external periphery on a rod 75 in intimate contact with the internal periphery of the skirt 67. The second Belleville washer 72 bears at its external periphery on the rod 75 in intimate contact with the internal periphery of the skirt 67 and at its internal periphery on a rod 77 carried by a sleeve 177 sliding along the smooth cylindrical external periphery of the internally threaded nut 61. This external periphery is here stepped.

The third Belleville washers bears at its internal periphery on the rod 77 and at its external periphery on a rod 76 in intimate contact with the internal periphery of the skirt 67.

Finally the front end Belleville washer 74 bears at its external periphery on the rod 76 and at its internal periphery on the fixed support 79.

In the clutch engaged position (top part of FIG. 6), the Belleville washers 71 to 74 have a roughly plane configuration and are under tension.

During the declutching operation these Belleville washers relax in order to counterbalance the action exerted by the diaphragm on the clutch release bearing 81.

The electric motor driving the shaft 51, fixed with respect to translation, the nut 61, fixed with respect to rotation and driven by the shaft 51 forming a screw, moves in translation axially in the direction of the base 66 of the casing 90 until the collar 68 comes into abutment on the said base.

In this position the clutch is disengaged and the Belleville washers 71 to 74 have an inclined position thus forming roughly a W.

It will be noted that the fixed 79 and movable 78 supports are located roughly on the same circumference, like the rod 77.

Because of the various lever arms, at the clutch release bearing 80, these Belleville washers reproduce the characteristic curve of the diaphragm as faithfully as possible, the electric motor having only a low energy to supply during the declutching operation.

During the clutch engagement operation, under the action of the diaphragm 3, the Belleville washers return to their initial plane position.

According to one characteristic, means of connecting in rotation 63, 65 exist between the casing 90 and the nut 61 forming the output element of the mechanical transmission. The nut thus effects a translation movement whilst being connected to the casing with respect to rotation.

It will be noted that the sleeve 177 moves axially during the declutching operation whilst being guided by the nut 61 without any risk of jamming. Likewise the rods 75 and 76 are guided by the casing without jamming.

The rods 75 and 76 are guided by the internal periphery of the skirt 67 of the casing 90.

Thus advantage is taken of the presence of this casing and of the nut in order to guide the force transmission means 75 to 77.

The means of connecting with respect to rotation consist here of a key 63 carried by the nut 61 engaging in the groove 65 in the sleeve 64 guiding the nut 61.

Naturally the structures can be reversed, the nut 61 having a groove and the sleeve 64 a sleeve or in general terms a tenon.

A rotational connection can be envisaged, with freedom of axial movement, by means of elastic tongues fixed at one end to the base of the casing and at their other end to the nut 61.

The elastic assistance means 70 therefore bear on a fixed part (the support 79) and on a movable part (the support 78) in order to act on the output element 61 of the transmission 60.

The mechanical transmission 60 is extremely simplified and has a minimum number of parts. It is therefore of a simple and economical form. Here the actuator acts by pushing by means of its output element (the nut 61) on the linkage.

This nut 61 can have for example at its rear end a threaded part for mounting, by screwing, a swivel acting on the free end of the declutching fork. As a variant a system of connecting rods can be provided.

Figure 7:
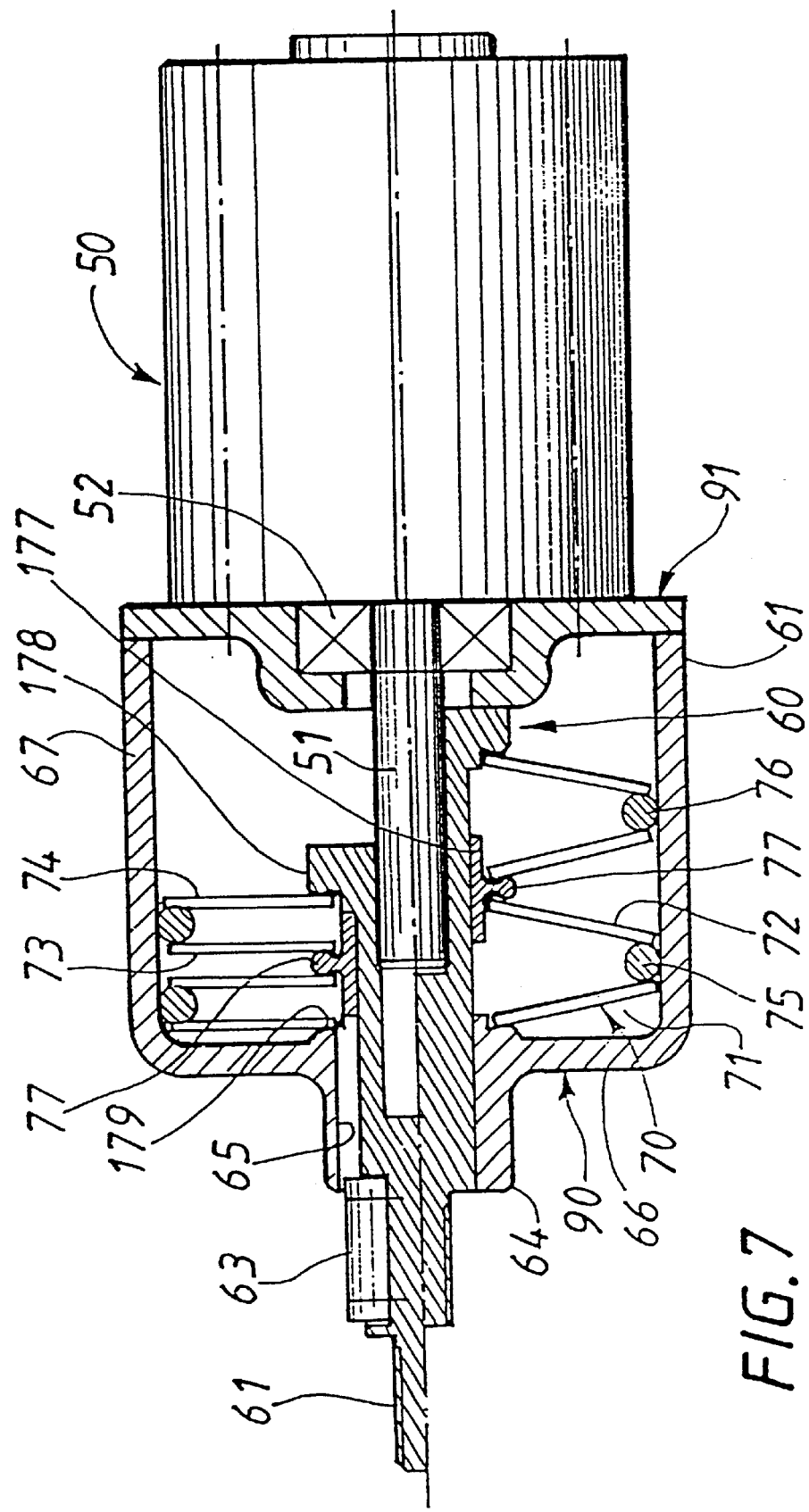
FIGS. 7 to 10 are views similar to FIG. 6 for other example embodiments.

Naturally it is possible to reverse the structures so that the nut acts by pulling on the linkage, as can be seen in FIG. 7. In this case the nut 61 has, in radial projection, a collar 168 and a movable support 178 turned towards the flange 91 and able to come into abutment with the latter when the clutch is disengaged.

It is the base 66 of the casing 90 which then carries the fixed support 179, the Belleville washers 71 to 74 having a roughly plane configuration when the clutch is engaged and an inclined position in order to form a double flywheel when the clutch is disengaged.

Thus by virtue of the invention it is possible to reverse these structures easily.

Figure 8:
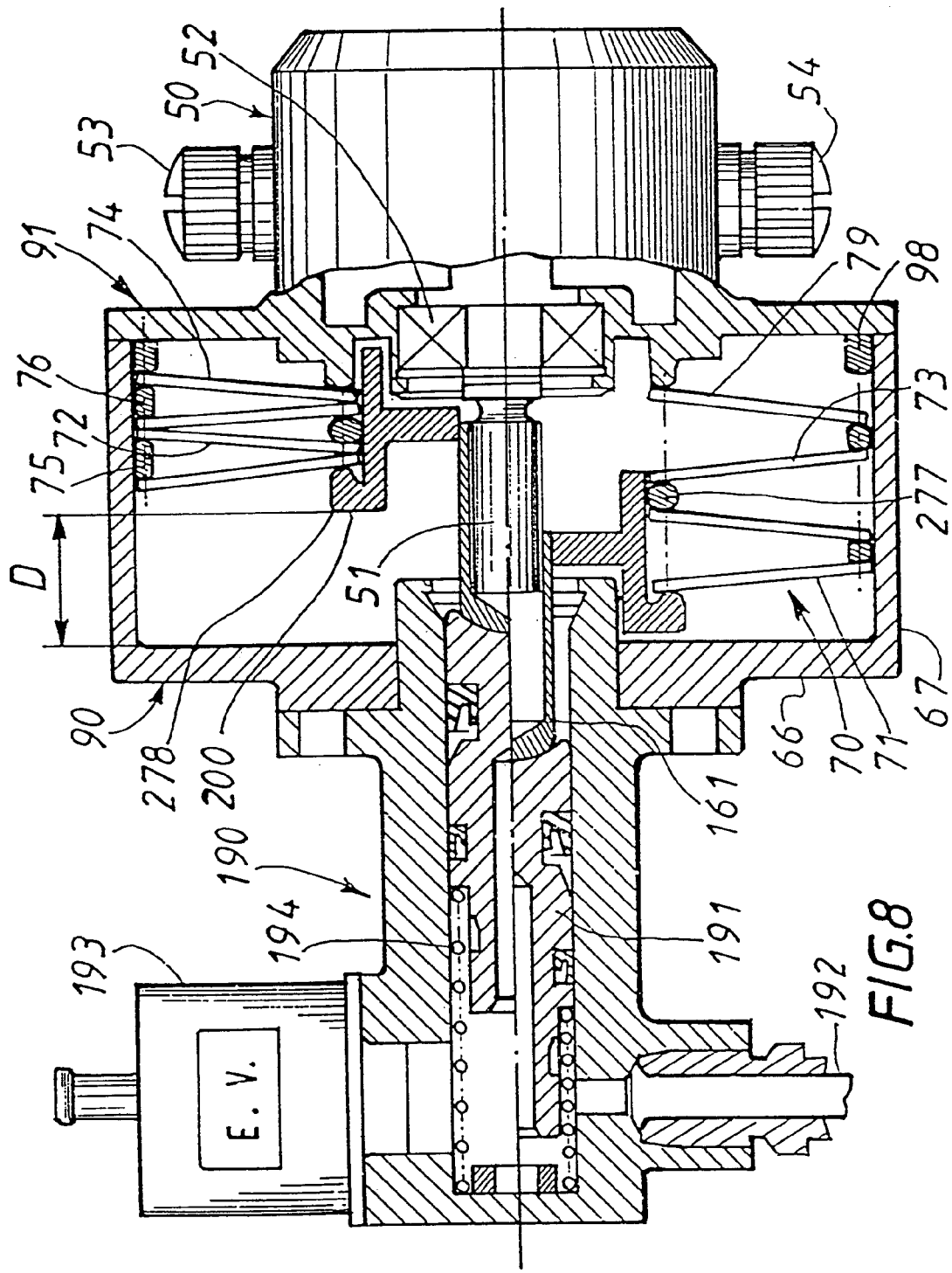

Naturally the linkage can have a hydraulic control, namely a sender 190 whose body is attached to the base 66 of the casing 90, as can be seen in FIG. 8.

The output element 161 (the nut) is shaped like a pusher in order to act on the piston 191 of the sender subjected to the action of a return spring 194 with possibly the intervention of a solenoid valve 193.

In the clutch engaged position the Belleville washers can then occupy an inclined position as can be seen in this FIG. 8 when the clutch is in the engaged position (top part of the figure) and occupy an inclined position when the clutch is disengaged (bottom part of the figure).

A stop 98 can be provided for limiting noise, this stop then being located at the internal periphery of the skirt 67 whilst being in contact with the flange 91.

The declutching travel D has been depicted in this figure.

It will be noted that the movable support 278 forms part of a piece 200 roughly in the form of a T attached in an elevated position on the front end of the nut. A simple rod 277 is then mounted so as to be movable axially on the piece 200 for transmitting forces.

By moving the piston 191 the control chamber of the sender is pressurized with the transfer of liquid via the pipe 192 from the sender to the receiver, whose piston acts on the clutch release bearing whilst being mounted so as to slide along a tubular part through which the input shaft of the gearbox passes.

Naturally the nut of the mechanical transmission according to the invention can act by pulling on a cable connected to the clutch release fork by means, for example, of a knob mounted on the free end of the fork.

Naturally the electric motor can be mounted on a part, namely a flange fixed to the cover of the clutch, as described in the aforementioned document FR-A-2 580 753. In this case the driven shaft does not pass through the actuator, the end of the driven shaft coming into engagement with the hub of the friction disc.

In the light of this document, it can be seen that the actuator can form a cartridge attached to the clutch cover.

Naturally the nut/screw system can be of the ball or roller recirculation type as described in the aforementioned document.

The number of Belleville washers depends on the application and more precisely on the travel D in FIG. 8, as well as naturally on the characteristic curve of the diaphragm.

The nut 61 acts directly or indirectly on the linkage 80.

Figure 9:
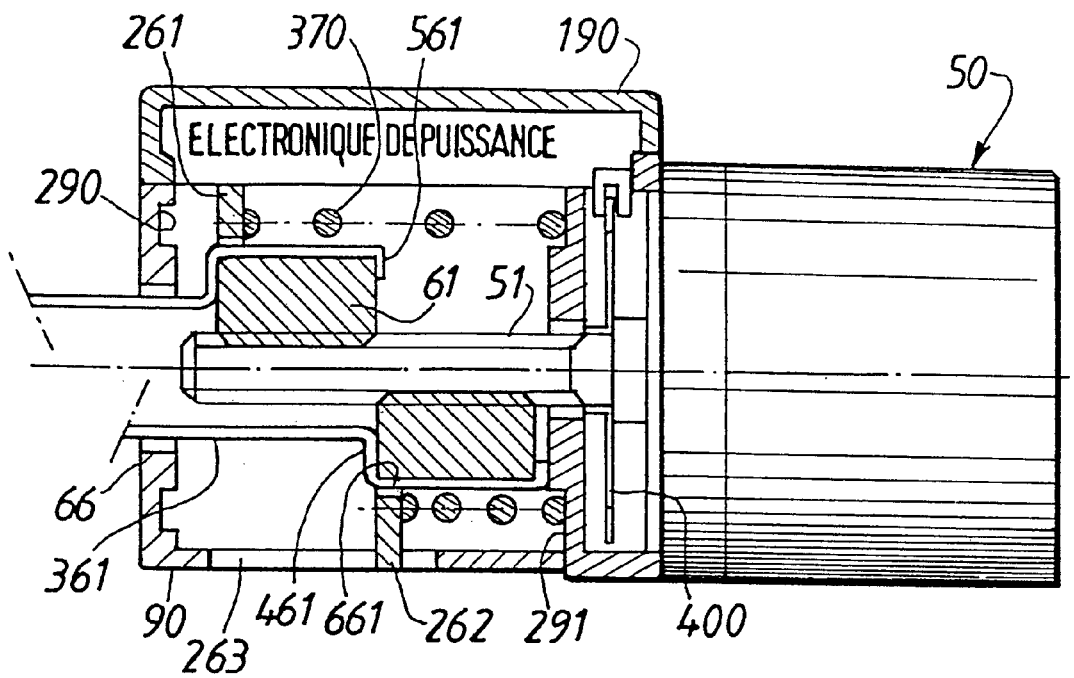
Figure 10:
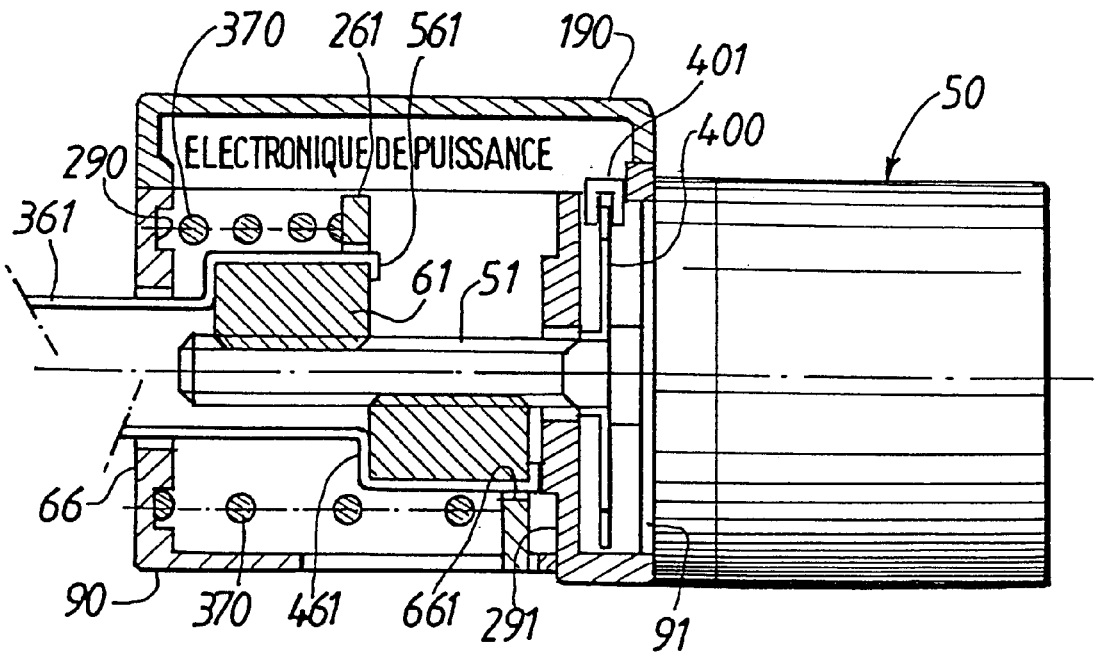

As a variant, in FIGS. 9 and 10, the elastic assistance means consist of a simple coil spring 370 and the characteristic curve of the diaphragm is not reproduced totally in absolute value, having regard to the lever arms.

In FIG. 9 the actuator is of the pushed type, the clutch release bearing acting in pushing on the fingers of the diaphragm 3, whilst in FIG. 10 the actuator is of the pulled type, the clutch release bearing acting by pulling on the fingers of the diaphragm 3.

In the top part of FIG. 9 the clutch is in the engaged position, whilst in the bottom part of this FIG. 9 the clutch is in the declutched or disengaged position.

In FIG. 10 it is the reverse, the clutch being in the declutched position in the top part of FIG. 10 and in the declutched position in the bottom part of this figure.

In these figures the output shaft 51 of the electric motor 50 carries integrally a phonic wheel 400 associated with a Hall-effect sensor 401. As is known, in the presence of a magnet, electrons are diverted. The Hall-effect sensor is based on this principle. The phonic wheel has holes at its external periphery.

When the shaft 51 turns it rotates the wheel 400, fixed to the said shaft, so that the magnetic field varies, the sensor 401 here having roughly a U-shaped cross section.

The rotation of the wheel thus gives precise information on the movement of the nut 61 able to be driven by the screw formed by the end of the shaft 51 fixed in translation in the aforementioned manner. The nut 61 is fixed in rotation in the aforementioned manner and is movable in translation when it is driven by the shaft 51, that is to say when the electric motor 50 is powered and therefore rotates. Thus, by virtue of the assembly consisting of the phonic wheel 400 and the Hall-effect sensor 401, the rotation of the shaft 51 and therefore the translational movement of the nut 61 is measured precisely, and this in an incremental fashion.

The nut 61 has at its external periphery, projecting radially outwards, a collar 261. This collar 261 forms a support for an axial end of the assistance coil spring 370, which thus surrounds the nut 61.

Here the collar 261 carries at its external periphery, projecting radially outwards, lugs 262 forming tenons, each engaged in a groove 263 forming mortices, formed in the skirt of the casing 90.

The nut 61 is thus fixed with respect to rotation whilst being able to move axially by virtue of a connection of the mortice and tenon type.

Advantageously two lugs 262 and two grooves 263, diametrically opposed, are provided.

As a variant a number of grooves 263 and lugs 262, evenly distributed, are provided.

By virtue of these arrangements there is no parasitic force on the screw.

The other end of the assistance spring 370 bears directly on the base 66 of the casing 90 (FIG. 10) or on a fixed flange 291 (FIG. 9). This fixed flange 290 has the shaft 51 pass through it whilst being fixed to the electric motor.

The flange 291 conceals the phonic wheel 400 interposed axially between the said flange and the front flange 91 of the casing of the electric motor 50. It is on this flange 91 that the casing 90 is partly fixed. The casing 90 has a top part 190 carrying the power electronics controlling the electric motor 50. This part 190 is therefore attached to the main part of the casing 90 and extends radially beyond the assistance spring 370.

A tube 361 is fixed to the nut 61. This tube is stepped in diameter in order to form a shoulder 461 at the change in diameter of the tube 361. The nut 61 is housed in the part of the tube 361 with the largest diameter. The nut 61 is immobilized axially whilst being captive between the shoulder 461 and the end of lugs 561 folded radially inwards.

These lugs 561 each pass through a hole 561 produced at the base 161 of the collar 261.

In FIG. 9 the portion of the tube 361 with the largest diameter is therefore divided into axial lugs 561, the free end of which is folded radially inwards.

In FIG. 10 the portion of the tube 361 with the largest diameter can be continuous and have the lugs 561 at its free end.

In fact, in FIG. 9, the assistance spring 370 bears on the flange 291 shouldered for this purpose in order to centre the spring 370 and on the collar 261 close to the base 66 of the casing 90 when the clutch is in the engaged position.

In FIG. 10, in the clutch engaged position, the spring 370 bears on the base 66 of the casing 90 and on the collar 261 close to the flange 291 in this case.

In FIG. 9 the collar 261 is therefore further away from the electric motor 50 than in FIG. 10. In all cases the portion of the tube 361 with the largest diameter is in internal contact with the external periphery of the nut 61.

It will be appreciated that the actuator in FIGS. 9 and 10 is particularly simple and that it can be standardized. This is the reason why the base 66 of the casing 90 has an indentation 290 for the possible support of the assistance spring 370. The single assistance spring 370 is less bulky radially than the assistance springs of FIGS. 6 and 8, which makes it possible to house the power electronics radially beyond the spring 370.

The nut 61 has a simple shape by virtue of the tube 361. It is through this tube 361 that the forces are transmitted.

The phonic wheel 400 and flange 291 are standard components.

Figure 6:
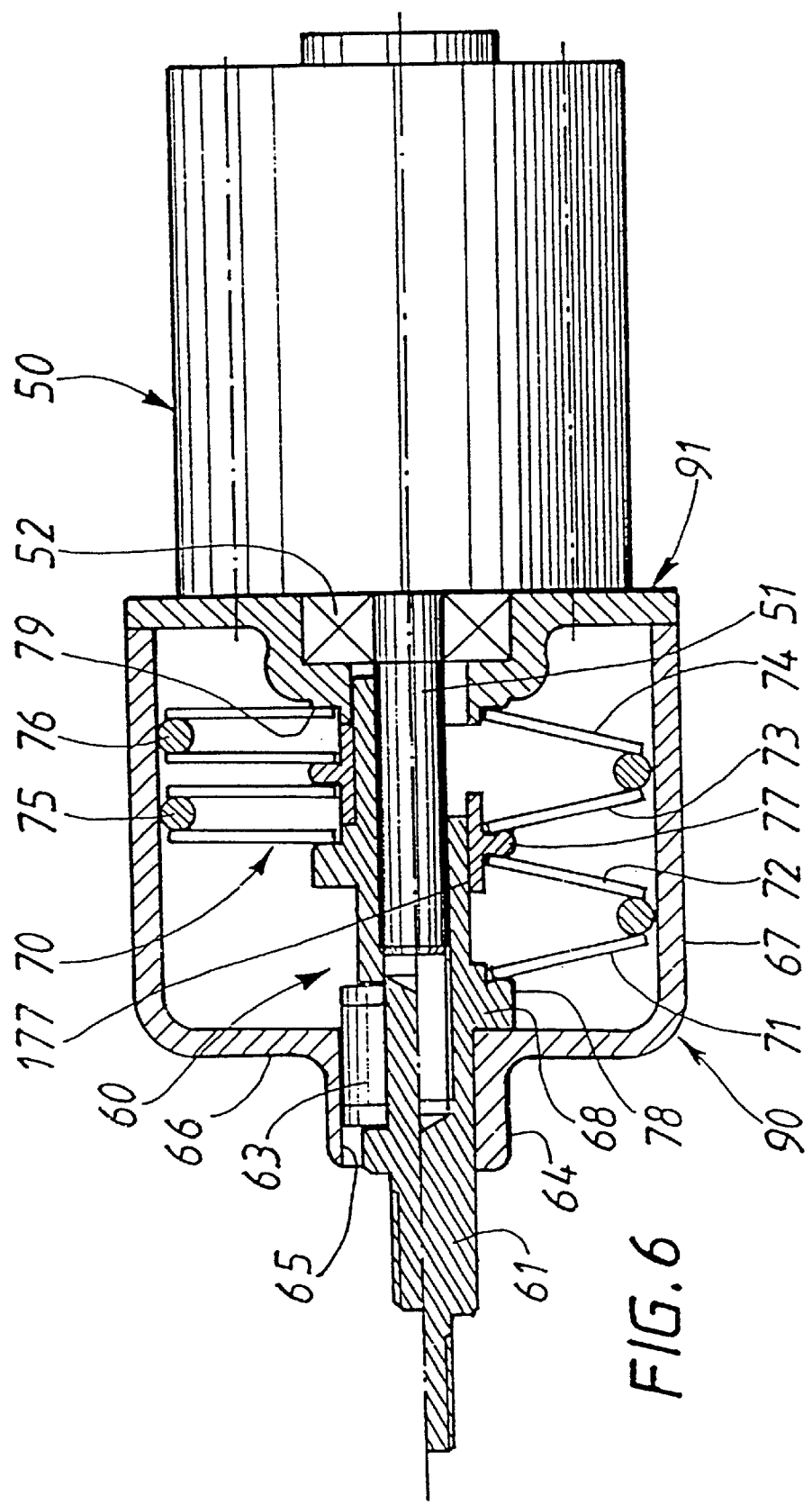
FIG. 6 is a schematic view of the actuator associated with the clutch device of FIGS. 3 to 5.

Naturally in FIGS. 6 to 8 it is possible to install a phonic wheel.

Naturally the device for taking up wear 10 can be controlled by the diaphragm as described in the document FR 96 11297 filed on Sep. 17, 1996.

Any other type of taking up wear can be envisaged.

Likewise, whereas in FIG. 3 the declutching means consist of the fingers of the diaphragm, any other embodiment can be envisaged.

For example, the declutching means can consist of a false diaphragm as described in the document DE-B-1 198 214, the engagement means consisting of a Belleville washer distinct from the false diaphragm. This false diaphragm can be of the type described in the document 96 11009 filed on Sep. 6, 1996. In this case the engagement means include two Belleville washers in series, of the negative and positive type.

It will be appreciated that the power electronics for controlling the electric motor 50 are integrated into the casing 90. These electronics include electronic components, notably power transistors as well as the sensor for measuring the movement of the nut 61, here of the Hall-effect type. As a variant the wheel 400 can carry an alternation of magnetic poles of opposite signs and the casing of the sensors, for example of the Hall-effect type. A rotation of the shaft 51 therefore gives rise to a variation in the magnetic field and a variation in current in the sensors. As a variant the sensor 400, 401 can consist of an optical sensor or other incremental sensor for measuring the rotation of the shaft 51. The connection device can be integrated into the casing 90. It is to this device that a power supply connector and a control connector linked to the electronic control module are connected.

What is claimed is:

1. Friction clutch, having on the one hand a clutch engagement device comprising engaging and disengaging means (3), bearing on a cover (2), the cover fixed to a flywheel (102) for driving in rotation, for action on a thrust plate (1) and clamping the friction linings (7) of a friction disc (6) between the trust plate (1) and the driving flywheel (102) and on the other hand a linkage (80) for acting in an opposing fashion on the internal end of the disengaging means (3), an actuator (50, 60, 70, 90, 91) for controlling said linkage in which the actuator has maneuvering means with an electric motor (50), a mechanical transmission (60) with an input element (51) formed by the output shaft of the electric motor (50), an output element (61, 161) for acting on the linkage (80), elastic assistance means (70) acting between a fixed part (91) and an element (61, 161) of the transmission in order to act in an opposing fashion with respect to the disengaging means so that the electric motor (50) provides only a small force for disengaging the clutch, the elastic assistance means (70, 370) bear on a fixed part (91, 66, 291) and on a part (61, 161) which is movable in translation and fixed in rotation forming a nut for cooperating with the output shaft (51) of the electric motor, forming a screw, movable in rotation and fixed in translation, in that the movable part (61) forms the output element of the mechanical transmission (60) whilst being able to act on the linkage (80), wherein the elastic assistance means consist of a mounting of Belleville washers (71 to 74) in series and in that force transmission means (75 to 77) act between the Belleville washers.

2. Clutch according to claim 1, characterised in that the force transmission means are guided partly by a fixed casing (90).

3. Clutch according to claim 2, characterised in that the force transmission means are guided partly by a piece (177) slidably carried by the nut (61, 161).

4. Friction clutch, having on the one hand a clutch engagement device comprising engaging and disengaging means (3), bearing on a cover (2), the cover fixed to a flywheel (102) for driving in rotation, for action on a thrust plate (1) and clamping the friction linings (7) of a friction disc (6) between the trust plate (1) and the driving flywheel (102) and on the other hand a linkage (80) for acting in an opposing fashion on the internal end of the disengaging means (3), an actuator (50, 60, 70, 90, 91) for controlling said linkage in which the actuator has manoeuvring means with an electric motor (50), a mechanical transmission (60) with an input element (51) formed by the output shaft of the electric motor (50), an output element (61, 161) for acting on the linkage (80), elastic assistance means (70) acting between a fixed part (91) and an element (61, 161) of the transmission in order to act in an opposing fashion with respect to the disengaging means so that the electric motor (50) provides only a small force for disengaging the clutch, the elastic assistance means (70, 370) bear on a fixed part (91, 66, 291) and on a part (61, 161) which is movable in translation and fixed in rotation forming a nut for cooperating with the output shaft (51) of the electric motor, forming a screw, movable in rotation and fixed in translation, in that the movable part (61) forms the output element of the mechanical transmission (60) whilst being able to act on the linkage (80), wherein the elastic assistance means (370) consist of a coil spring surrounding the nut (61).

5. Clutch according to any one of claims 1, 2, 3 or 4, characterised in that the elastic assistance means are mounted inside a fixed casing (90) closed by a cover (91) serving as a support for the electric motor (50).

6. Clutch according to claim 5, characterised in that the casing is hollow in shape and has a base (66) with a guidance sleeve (64) for the nut (61).

7. Clutch according to claim 6, characterised in that means of connection in rotation with axial mobility (63, 65) act between the sleeve (64) and the nut (61).

8. Clutch according to claim 7, characterised in that the means of connecting in rotation consist of a key carried by the nut (61) sliding axially in a groove (76) formed in the sleeve (64) of the casing (90).

9. Clutch according to claim 5, characterised in that one of the components consisting of the cover (91) and base (66) of the casing (90) has a fixed support (79, 179) for the elastic assistance means (70).

10. Clutch according to claim 9, characterised in that the nut carries, projecting radially, a support (78, 178, 161) movable with the nut (60) to support at least one of the Belleville washers of the elastic assistance means.

11. Clutch according to any one of the claims 1, 2, 3 or 4, characterised in that the output shaft (51) carries a phonic wheel (400) associated with a Hall-effect sensor (401) for measuring the movement of the nut.

\* \* \* \* \*